United States Patent Office 2,902,458
Patented Sept. 1, 1959

2,902,458

AQUEOUS ADHESIVE COMPRISING ACID, PHENOL-ALDEHYDE RESIN AND POLYMER OF VINYL ACETATE

Jan Teppema, East Gloucester, Mass., assignor, by mesne assignments, to The Borden Company, New York, N.Y., a corporation of New Jersey No Drawing. Application October 11, 1954
Serial No. 461,677

2 Claims. (Cl. 260—29.3)

The present invention relates to adhesives useful in the bonding of wood, fabric, paper and similar products. In particular, it relates to an adhesive which sets rapidly at room temperature and has an extremely high shear strength.

The requirements for a satisfactory adhesive are dependent upon many factors, many of which are independent of one another. One important prerequisite of an adhesive is that it form a bond between two given surfaces which approximates in order of magnitude the strength of the materials joined. Another requirement of a satisfactory adhesive is that its final physical properties are similar to those of the materials bonded, as regards, for example, resistance to heat, light, water, air, vibration, and freezing, etc. In addition to these requirements, there are many significant applications and economic considerations. An adhesive should, for example, be easily applied to the joining surfaces. Further, a slow setting time substantially increases the manufacturing cost since clamping devices must be used that much longer; whereas a fast setting time decreases substantially the cost of application since the clamping mechanisms need only be used a short time. Also, the typical action of an adhesive is that it first forms a tacky film which holds the joining surfaces in place but must then be hardened or cured by further chemical or physical means to achieve its maximum bond strength. The time of such hardening or curing is, of course, an obvious economic problem. In addition, the temperature of curing is significant since it is much cheaper and requires less equipment to cure at room temperature rather than at elevated temperatures. The elevated temperature of curing must not be so high as to damage the joining surfaces. It can thus be seen that while certain adhesives may possess some of the desired properties, they may also lack many of the others.

In the field of wood, wood products and wood laminates there are some special adhesive problems, including resistance to crazing and shrinkage of glue lines, resistance to shock and fatigue, stability of color, requirement of wide weather resistance and the necessity for fast uniform curing to permit maintenance of rapid production schedules. In application the adhesive would store well, be easily applied with a glue spreader or brush and have a good pot life. Further, a satisfactory wood adhesive must often have gap filling properties and form a bond without sanding or other abrasion of the joining surfaces. It is important that such wood products be fully water proofed and not merely water resistant and that their glue joints be immune to fungus attack.

In the manufacture of plywood, plywood products and furniture, thermo-setting resins have been extensively used, but do not combine all the desired properties. There has long been an unfilled need for an adhesive which would have a quick "grab" for wood products, be curable without heat, have an improved shear resistance, and have an improved water resistance.

The present invention contemplates the provision of an adhesive composition which forms durable, water-proof bonds with wood, "grabs" quickly the surfaces to be joined, and can be cured to full bond strength with or without the application of heat or high frequency radiation.

In accordance with this invention, aqueous dispersions containing addition polymers and normally inter-reactive phenol-aldehyde resins are used to bond wood and related products at low clamping pressure and at room temperature. It is preferred that these dispersions be prepared by mixing polymeric emulsions with dispersed or dispersible phenol-aldehyde resins. Polymers useable include those made in substantial proportion from polymerisable monomers having at least one carbon-carbon double bond. Such monomers include but are not limited to vinyl monomers such as vinyl acetate, vinyl propionate and vinyl butyrate; vinyl chloride; vinylidene chloride; styrene; alphamethylstyrene; vinyl toluene; vinyl naphthalene; methyl, ethyl, propyl and butyl acrylates and methacrylates; chloroprene; polybutadiene; and isoprene. In addition to homopolymers from such monomers, copolymers can also be used as, for example, vinyl acetate, dibutyl maleate, styrene-acrylonitrile, acrylate and methacrylate esters with acrylonitrile, isoprene-styrene, isoprene-acrylonitrile, butadiene-styrene and butadiene and methacrylate and acrylate esters.

Phenol aldehyde resins useable with this invention include any phenol-aldehyde condensation product that is further inter-reactive and either soluble in water, soluble in a solvent to form a dispersible solution, directly dispersible in water, or soluble in a solvent to form a solution from which a dispersion compatible with the polymeric emulsion can be formed. Among such condensation products are those that are base catalyzed to yield liquid, A-stage products. The preferred phenolic components useable in the condensation products include phenol, substituted phenols, polyhydric phenols and mixtures thereof. The preferred aldehydic components include formaldehyde, furfuraldehyde, acetaldehyde, paraldehyde, polymers and mixtures thereof. The essential requirement other than water-dispersibility or solubility is that the condensation product be normally inter-reactive in the sense that it is an intermediate product, normally further self-reactive so as to form cross-linkages in the presence of either heat or catalysts, or both. It is also essential, of course, that it be formed into a dispersion having a substantially aqueous phase in order to be compatible with the polymeric vinyl emulsions.

It should be noted that the separate use of addition polymer such as polyvinyl acetate emulsions and of phenol-aldehyde-resins as adhesives is not new. Polyvinyl acetate emulsions provide flexible thermo-plastic films noted for high bonding strength to many surfaces, but also characterized by relatively poor water resistance and low shear strength. Previously described modifications of polyvinyl acetate emulsions have been attended by either poor water resistance, emulsion instability, or low shear strength.

Methods of making polyvinyl emulsions such as are useable in this invention are well known and are conveniently summarized in the book, "Vinyl and Related Polymers," by C. E. Schildknecht (Wiley, New York, 1952), in which there is a large bibliography, both of patents and publications.

Polyvinyl ester emulsions, for example, can be produced by reacting the vinyl ester monomer in aqueous dispersion at temperatures 70 to 85° C. in the presence of an emulsifying agent and catalyst. Emulsifying agents commonly used in preparing such polymeric vinyl emulsions include polyvinyl alcohol, fatty alcohol sulfates, polyethylene oxide condensation products with fatty acids, alkyl-aryl sulfonates and protective colloids, such as proteins and polymeric carbohydrates. Catalysts include peroxides and persulfates such as benzoyl peroxide and potassium persulfate. A wide variety of polyvinyl emulsions are available commercially, and usually have particle size ranging from 0.05 to 0.20 micron, total solids of 45 to 60 percent, pH 4 to 6, and a viscosity range of 500 to 2000 centipoises.

As Example 1, a polyvinyl ester emulsion suitable for use in this invention is prepared as follows:

| | Parts by weight |
|---|---|
| Water | 50 |
| Vinyl acetate | 50 |
| Polyvinyl alcohol (emulsifier) | 5 |
| Sodium acetate | 3 |
| Potassium persulfate (catalyst) | .1 |

The above ingredients are reacted in a vessel equipped with a reflux condenser and an agitator at a temperature of about 75° C. for about two hours.

As Example 2, a suitable polyvinyl acetate emulsion can be prepared as follows:

| | Parts by weight |
|---|---|
| Water | 49 |
| Dioctyl sodium sulfosuccinate (emulsifier) | 3 |
| 30% hydrogen peroxide (catalyst) | 0.2 |
| Vinyl acetate | 51 |

The above ingredients are reacted in a vessel equipped with an agitator and a reflux condenser at a temperature of 65° C. for about two to four hours.

As Example 3, a suitable polyvinyl acetate emulsion can be prepared as follows:

| | Parts by weight |
|---|---|
| 0.1-N solution of equal parts of sodium acetate and sodium hydroxide | 35 |
| Benzoyl peroxide | 0.1 |
| 0.3% aqueous solution of dioctyl sodium sulfosuccinate | 55.0 |
| Vinyl acetate | 60.0 |

The above ingredients are reacted at 65° C. to 70° C. for two to four hours in a vessel having an agitator and reflux condenser.

Example 4 is a vinyl acetate copolymer emulsion:

Parts by weight:
  50 of water
  45 of freshly distilled vinyl acetate
  5 dibutyl maleate
  5 polyvinyl alcohol (emulsifier)
  3 sodium acetate
  .5 potassium persulfate (catalyst)

The ingredients are reacted at 65° C. to 70° C., until the reaction is completed, usually 4 to 8 hours.

Polystyrene emulsions suitable for use in this invention are prepared by reacting styrene dispersed in water with a catalyst such as potassium persulfate, in the presence of a buffer such as sodium dihydrogen phosphate and an emulsifier such as lauryl sodium sulfate, depending upon the concentration and type of catalysts. The reaction takes between 1 and 3 hours in a temperature range from 50 to 90° C.

As Example 5, a suitable polystyrene emulsion is prepared as follows:

| | Parts by weight |
|---|---|
| Styrene | 100 |
| Water | 100 |
| Sodium salts of soluble rosin acids (emulsifier) | 5 |
| Sodium hydroxide | 0.061 |
| Potassium persulfate (catalyst) | 0.60 |

The above mixture, of pH about 11, is reacted for about ten to fourteen hours at 50° C.

Preparation of copolymers of styrene, such as butadiene-styrene copolymers have been well described. As Example 6, the following formulation can be used in the practice of this invention by reacting with agitation at 30° C.:

| | Parts by weight |
|---|---|
| Butadiene | 70 |
| Styrene | 30 |
| Water | 20 |
| Nonyl phenol condensate with ethylene oxide | 5 |
| Cumene-hydroperoxide (catalyst) | 0.5 |
| Iron sulfate | 0.05 |
| Sodium phosphate | 0.5 |
| Sorbose | 0.5 |

This particular formulation known as a redox type recipe yields a substantially complete product after five hours.

Various examples of phenol-aldehyde resins useable with this invention are given below. As will be noted, especially satisfactory results are obtainable with base-catalyzed condensations carried out to the so-called resol or A-stage to yield a resin which may be liquid itself, but which in any case is dilutable or dispersible with water to a high solids content to form a dispersion compatible with the vinyl emulsion.

As Example 7, a phenolic resin is prepared by slow reflux of 1 mol of phenol, 1.9 mols of formaldehyde and .2 mol of sodium hydroxide with a minimum amount of water for about 30 minutes or until the proper viscosity is obtained. The resultant resin is an A-stage or resol liquid resin, which will become infusible upon heating, and after adjusting has the following typical properties:

| | |
|---|---|
| pH | 7.2 |
| Solids content percent | 65 |
| Specific gravity | 1.202 |
| Viscosity centipoises | 22 |
| Water dilutability percent | 300 |

In practising this invention, the resin may be used as formed, or as extended with a suitable solvent such as methyl ethyl ketone.

The following Example 8 is of a mixed phenol condensate:

A resin dispersion suitable for mixing with polymeric emulsion is prepared as follows:

75 parts phenol
25 parts cardanol
80 parts formaldehyde are refluxed in the presence of 5 parts of 2-N hydrochloric acid with a minimum amount of water until a solid fusible reaction product is formed. The product is then recovered and dissolved as a 70 percent solution in methyl ethyl ketone. This resin solution can be used directly at half-strength or emulsified as follows:

50 parts resin solution is added to a mixture comprising 46 parts of water, 3⅓ parts of casein, and 0.35 part of 50 percent sodium hydroxide solution. The resultant dispersion is then ready for mixture with the polymeric vinyl emulsion.

Although any solids content of components can be used, it is preferred that the polymeric emulsion have a solids content of 30–65 percent and the phenolic resin 30–75 percent. Practically any ratio of components can be used, but especially useful is the range of 2–4 parts in terms of solids of polymer per part of phenolic resin. In this latter range using polyvinyl acetate emulsion (about 55 percent solids) and phenolic-formaldehyde resin (about 75 percent solids) the resultant viscosities are in the range 500–1500 centipoises, with a stable end product.

A specific embodiment of the present invention is illustrated in the following Example 9:

100 parts of polyvinylacetate (prepared as in either Example 1, 2 or 3)
40 parts of A-stage liquid phenol-formaldehyde resin (prepared as in Example 7)

After mixing the resin and emulsion, 2.4 parts of 3.2-N toluenesulfonic acid were slowly added at room temperature. When thoroughly mixed, the composition was brushed on two pieces of kiln dried rock maple. The surfaces were formed at a clamping pressure of about 200 pounds per square inch for 30 minutes and allowed to cure at room temperature for 14 days. When tested in an Olson tensile tester, the samples broke at at least 3,000 pounds per square inch with 100 percent of the failures being in the wood. When the samples were given 10 cycles of overnight soaking in water at room temperature followed by 20 hours drying at 140° F., there was no delamination and no change in breaking tensile or wood failure. Where the above samples were cured for five minutes at 135° C, there was no blush or peel or change in breaking strength or wood failure after immersion in boiling water or indefinite soaking in water at room temperature.

Other specific embodiments follow:

Example 10

50 parts of polyvinyl acetate emulsion (Example 2)
85 parts of A-stage one step liquid phenol-formaldehyde resin dissolved as 60 percent solids in 75 percent aqueous isopropyl alcohol (Example 7)
20 parts of water
15 parts of 10 percent aryl-alkyl sulfonate solution The resultant mixture, when dried, yielded a flexible film rapidly cured with heat in the presence of hydrochloric, sulfuric or toluene-sulfuric acid. It bonded well to maple.

Example 11

100 parts of polyvinyl acetate emulsion (Example 3)
10 parts of A-stage liquid phenol-formaldehyde resin, dissolved as 75 percent solids in 20 percent aqueous methyl ethyl ketone solution (Example 7)
10 parts water
0.6 part of 3.2 normal benzene-sulfonic acid The resultant mixture formed a wood to wood bond in 20 to 40 minutes and cured in about two weeks at room temperature or 100 seconds at 350° F. Where Example 11 was used in fir plywood panels, ¾ inch by 6 inches by 4 feet, clamped overnight and then maintained for three weeks at room temperature, there was only 10 percent delamination after testing with United States Government specification M.A.L.-A 397A (75 p.s.i. and 3 cycles of drying and soaking).

Example 12

100 parts of polyvinyl acetate emulsion (Example 1)
20 parts of liquid phenol-formaldehyde A-stage resin (Example 7)
2 parts of 3.2-N toluene sulfonic acid This product, when mixed and applied to fabric (cotton), gave a stiff laminate which retained its flexibility at 160° F. at 24 hours in the air.

Example 13

100 parts of polyvinyl acetate emulsion (Example 2)
50 parts of liquid phenol formaldehyde resin as a 75 percent solids aqueous solution (Example 7)
10 parts of water
3 parts of 3.2-N toluene sulfonic acid This product was found to be rubbery at 230° F. and when cast on glass was difficult to scratch below 180° F. When tested as a bond for fir to fir there was 85 percent wood failure at 1070 pounds per square inch. With oak to oak, there was 82 percent wood failure at 2396 pounds per square inch. Both these figures compare favorably with phenol-resorcinol glues.

Example 14

100 parts of polyvinyl acetate emulsion (Example 2)
50 parts of liquid phenol-furfuraldehyde resin, dispersed as 75 percent solids in water, resin being prepared by reacting 1 mol of phenol with 1.8 mols of furfuraldehyde and .2 mol sodium hydroxide at about 100° for 40 minutes
2 parts 2-N sulfuric acid The above components when mixed, and applied to wood, set up in 30 minutes and were cured in two minutes at 350° F. to a high bond strength.

Example 15

100 parts of polystyrene emulsion (Example 5) or butadiene-styrene copolymer emulsion (Example 6)
40 parts of liquid phenol-formaldehyde resin (Example 7)
2 parts of 2-N hydrochloric acid The above mixtures when applied to wood set up in 35 minutes and was cured in three minutes at 345° F. to a high bond strength.

Example 16

100 parts of polyvinyl acetate-maleate emulsion (Example 4)
50 parts of mixed phenol-formaldehyde condensate dispersion or solution (Example 8)
10 parts water
3 parts 3.2-N toluene sulfonic acid The product when dried and cured between fir-fir pieces gave a water-resistant bond of over 1000 pounds per square inch with over 80 percent wood failure.

All the embodiments illustrated above (Examples 9–16) were found to be adapted for use with high-frequency curing apparatus, including the sort at present used for wood bonding.

In addition to single components, in an admixture combinations of components can also be used and are considered within the scope of this invention. Thus, the vinyl emulsion component might include a compatible mixture of polystyrene and polyvinylacetate emulsions, and the resinous dispersion might contain phenol-formaldehyde resin and cardanol-furfural resin.

Further, polymeric vinyl emulsions which contain modifiers, plasticizers, extenders, or small amounts of solvent or co-monomer in addition to the principal monomer, have been found equally effective as compared to substantially pure emulsions of similar solids content and stability. Examples of such modified vinyl emulsions are the commercial emulsions, Polycos 117SS, 117 H, 376, 380, 397–70 NS, 456 and 1040–14B, all products of the American Polymer Co., Peabody, Massachusetts.

Acids are not necessary to accomplish the excellent bonding qualities of this invention but appear to act as catalysts in speeding up the bonding reaction. In addition to the acids shown in the examples above, the other acids such as trichloracetic, or hypophosphorous acid can be used. The only limitations on the use of acids appear to be that the amount and strength do not destabilize the admixture or its components or affect the products being bonded.

The term polymer of vinyl acetate as used in the appended claims is intended to include both homopolymers and copolymers of vinyl acetate with small amounts of comonomer, as, for example, 10% of dibutyl maleate.

In the appended claims the range of acid proportions are expressed in terms of milliequivalents per hundred parts of total dry resin. The acid range expressed is found in the specific examples, namely, Examples 15 and 16.

The calculation of milliequivalents of acid per 100 parts of the dry resin total of polymer and phenolic is calculated as follows. The total parts by weight of the acid is multiplied by its normality to give the total milliequivalents of acid. The dry resin total is obtained by multiplying the number of parts by the percent solids for each resin and adding the sum thereof. Then, the milliequivalents are divided by the dry total weight and multiplied by 100.

For example, in Example 11 the total milliequivalents of acid is 0.6 times 3.2 or 1.92. The total dry resin is (100) (.40) plus 10 or a total of 50. If we divide 1.92 by 50, this is equivalent to 3.84 per 100.

In Example 16 the total milliequivalents of acid is 3 times 3.2 or 9.6. The total dry resin is (100) (.50) plus (50) (.70) or a total of 85. This ratio of 9.6 to 85 is equivalent to 11.3 per 100.

In Example 15 the total milliequivalents of acid is 2 times 2 or 4.0. The total dry resin (using Example 6 polymer) is (100) times 106.5/126.5 plus (40) (.65) or a total of 110. This ratio of 4 to 110 is equivalent to 3.64 per 100.

I claim:

1. An admixture of acid with an aqueous resinous dispersion; said dispersion comprising dispersed therein an A-stage water-dispersible resinous product of the condensation of a phenol and an aldehyde and polymer of vinyl acetate; said acid being selected from the group consisting of toluene-sulphonic acid, benzene sulfonic acid, hydrochloric acid, sulfuric acid, trichloracetic acid, and hypophosphorous acid; the weight ratio of polymer of vinyl acetate to resinous product being in the range of approximately 0.3 to 4.0; the amount of acid in milliequivalents per 100 parts of the total of polymer of vinyl acetate and resinous product being in the range of approximately 3.6 to 11.3, said admixture being characterized as being a wood bonding adhesive.

2. The admixture of claim 1, wherein the condensation product is formed from phenol and formaldehyde.

References Cited in the file of this patent

UNITED STATES PATENTS

| | | |
|---|---|---|
| 2,481,879 | Ross | Sept. 13, 1949 |
| 2,564,291 | Wolf | Aug. 14, 1951 |
| 2,652,353 | Wilson | Sept. 15, 1953 |
| 2,673,824 | Biefeld et al. | Mar. 30, 1954 |